(12) United States Patent
Chung et al.

(10) Patent No.: US 10,845,634 B1
(45) Date of Patent: Nov. 24, 2020

(54) LIQUID CRYSTAL DISPLAY DEVICE AND METHOD FOR ASSEMBLING SAME

(71) Applicants: HONG FU TAI PRECISION ELECTRONS (YANTAI) CO., LTD., Yantai (CN); HON HAI PRECISION INDUSTRY CO., LTD., New Taipei (TW)

(72) Inventors: Cheng-Fa Chung, New Taipei (TW); Na Wang, Yantai (CN)

(73) Assignees: HONG FU TAI PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/444,204

(22) Filed: Jun. 18, 2019

(30) Foreign Application Priority Data

May 13, 2019 (CN) .......................... 2019 1 0394498

(51) Int. Cl.
*G02F 1/1333* (2006.01)

(52) U.S. Cl.
CPC ................. *G02F 1/133308* (2013.01); *G02F 2001/133314* (2013.01); *G02F 2001/133325* (2013.01); *G02F 2202/28* (2013.01)

(58) Field of Classification Search
CPC ............................................... G02F 1/133308
See application file for complete search history.

(56) References Cited

U.S. PATENT DOCUMENTS

| | | | |
|---|---|---|---|
| 2010/0201908 A1* | 8/2010 | Ishida | G02F 1/133308 349/58 |
| 2010/0208161 A1* | 8/2010 | Sasaki | G02F 1/133608 349/58 |
| 2013/0088661 A1* | 4/2013 | Shin | G02F 1/133308 349/58 |
| 2014/0098522 A1 | 4/2014 | Li | |
| 2014/0226081 A1* | 8/2014 | Tomomasa | G02F 1/133308 348/794 |
| 2016/0026030 A1* | 1/2016 | Kang | G02F 1/133308 349/58 |
| 2016/0062523 A1* | 3/2016 | Jeong | G02F 1/1336 349/12 |
| 2017/0153485 A1* | 6/2017 | Kim | G02B 6/0055 |
| 2017/0153487 A1* | 6/2017 | Kim | G02B 6/0055 |
| 2017/0163927 A1* | 6/2017 | Kawasaki | G02F 1/133308 |
| 2017/0261804 A1 | 9/2017 | Zhao et al. | |

(Continued)

FOREIGN PATENT DOCUMENTS

| | | | | |
|---|---|---|---|---|
| CN | 205014163 U | * | 2/2016 | ........... G02F 1/1335 |
| TW | 201416775 A | * | 5/2014 | ............. G02F 1/133 |
| TW | 201416775 A | | 5/2014 | |

(Continued)

*Primary Examiner* — Sang V Nguyen
(74) *Attorney, Agent, or Firm* — ScienBiziP, P.C.

(57) ABSTRACT

A liquid crystal display device includes a backboard and a liquid crystal panel. The liquid crystal panel includes a first fastener and a second fastener. The first fastener is disposed and fixed on a peripheral portion of a side of the liquid crystal panel facing the backboard. The second fastener is fixed to a peripheral portion of the backboard facing the liquid crystal panel. The first fastener and the second fastener are engaged with each other.

10 Claims, 13 Drawing Sheets

(56) References Cited

U.S. PATENT DOCUMENTS

2018/0364517 A1\* 12/2018 Oh ................... G02F 1/133308
2019/0154908 A1\* 5/2019 Yabuuchi .......... G02F 1/133308

FOREIGN PATENT DOCUMENTS

| TW | 520153 U | \* | 4/2016 | ........... G02F 1/1335 |
| TW | M520153 U | | 4/2016 | |
| WO | 2014056196 A1 | | 4/2014 | |

\* cited by examiner

LIQUID CRYSTAL DISPLAY DEVICE AND METHOD FOR ASSEMBLING SAME

FIELD

The subject matter herein generally relates to display modules, and more particularly to a liquid crystal display device having a reduced thickness and a method of assembling the liquid crystal display device.

BACKGROUND

Referring to FIG. 1, a liquid crystal display device 10 in the related art generally includes a backboard 11 coupled to a liquid crystal panel 12 by a middle frame 13. An end of the backboard 11 adjacent to the middle frame 13 generally includes a hook 11a connected to the middle frame 13, and the liquid crystal panel 12 is generally adhered to the middle frame by an adhesive layer 14. An optical film set 16 is placed between the backboard 11 and the liquid crystal panel 12. A width C of the liquid crystal display device 10 includes a width A of an exposed portion of the middle frame 13 and a width B of a non-display area of an edge of the liquid crystal display device 10. At present, many borderless display devices on the market still have a visible width A of the exposed middle frame 13, so there is no real frameless display device on the market. Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
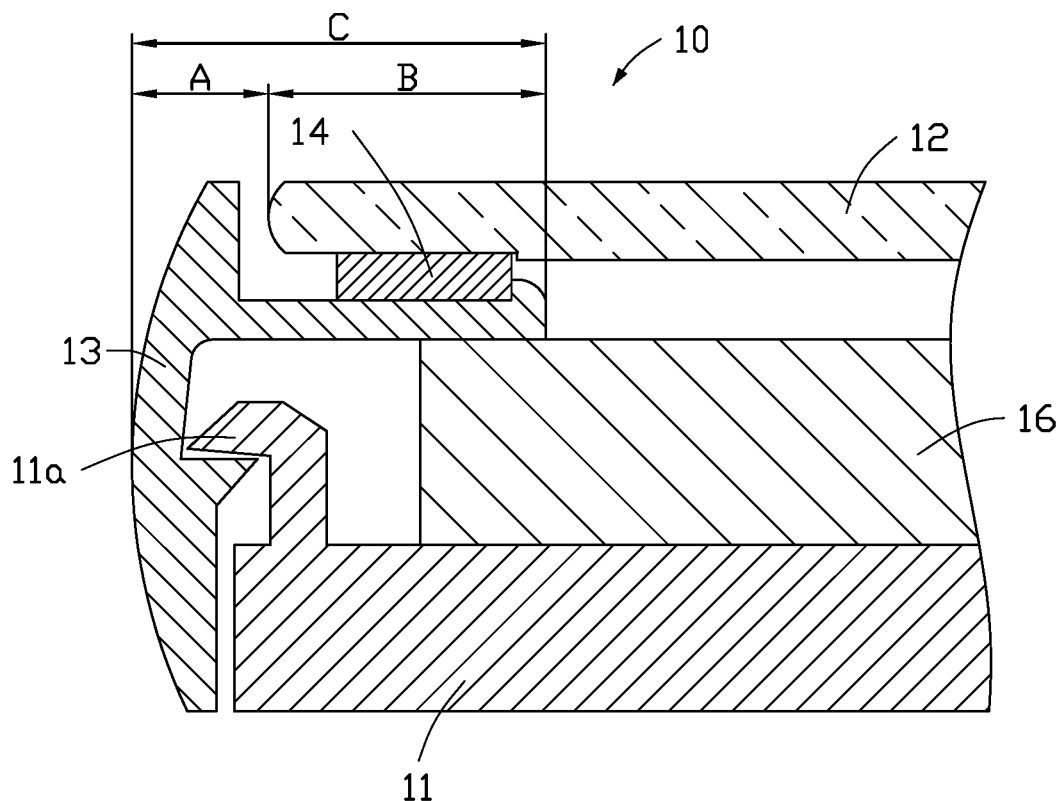
FIG. 1 is a cross-sectional view of a liquid crystal display device in the related art.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
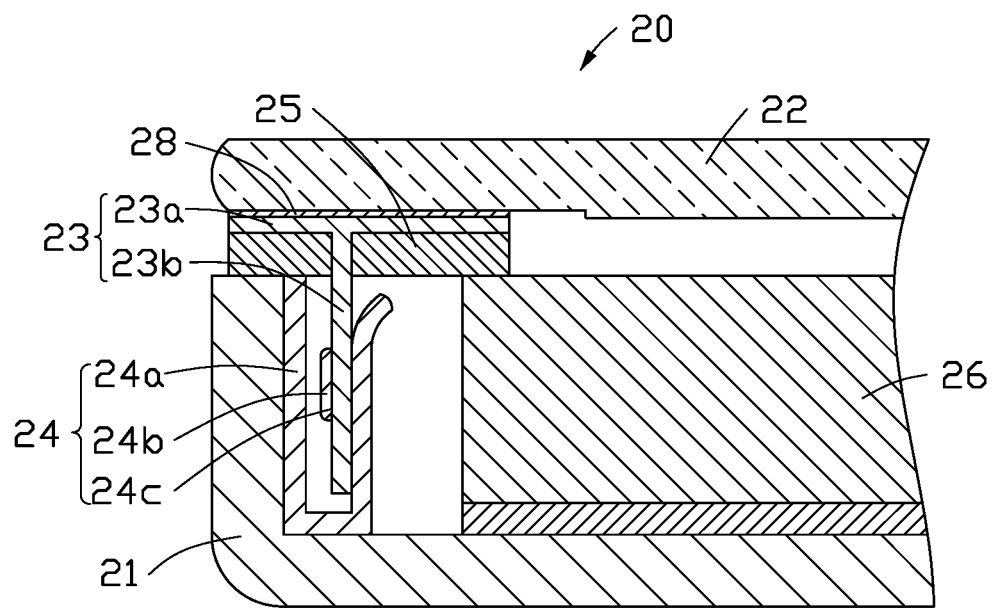
FIG. 2 is a cross-sectional view of a liquid crystal display device having a first embodiment of a first fastener and a second fastener.

FIG. 2 shows an embodiment of a liquid crystal display device 20 including a backboard 21, a liquid crystal panel 22, a first fastener 23, and a second fastener 24. The backboard 21 is for mounting a backlight. The liquid crystal panel 22 is for displaying an image on a light path of the backlight. The first fastener 23 is disposed on a peripheral portion of the liquid crystal panel 22 adjacent to the backboard 21 and is fixed to the liquid crystal panel 22. The second fastener 24 is fixed to a peripheral portion of the backboard 21 facing the liquid crystal panel 22. The first fastener 23 and the second fastener 24 are latched with each other.

In one embodiment, the first fastener 23 is bonded to the liquid crystal panel 22 by an adhesive 28, and the second fastener 24 is fixed to the backboard 21 by welding, riveting, or mechanical locking. Mechanical locking refers to manual or mechanical locking by mechanical means such as screws. An orthographic projection of the first fastener 23 and the second fastener 24 on the liquid crystal panel 22 does not exceed or partially exceed an outermost edge of the liquid crystal panel 22.

In one embodiment, the first fastener 23 and the second fastener 24 are engaged with each other by elastic engagement, so that the liquid crystal panel 22 and the backboard 21 are fixed together. Elastic engagement refers to the first fastener 23 being partially engaged with the second fastener 24 by being partially embedded and engaged with the second fastener 24 in a direction perpendicular to the liquid crystal panel 22 toward the backboard 21 and being tightly engaged and fixed by the second fastener 24, so that the first fastener 23 or the second fastener 24 undergoes a certain elastic deformation.

Figure 3:
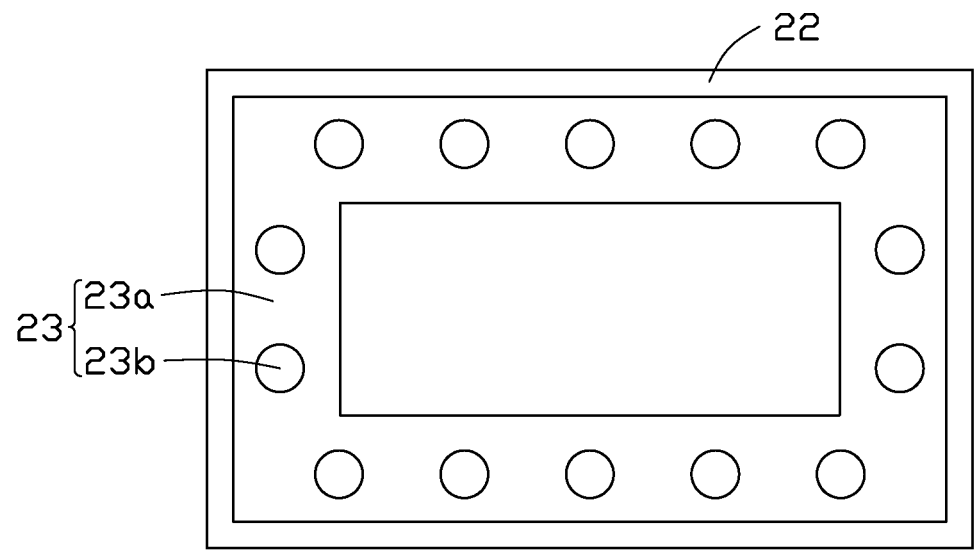
FIG. 3 is a schematic diagram of an embodiment of distribution of the first fastener on a liquid crystal panel.
Figure 4:
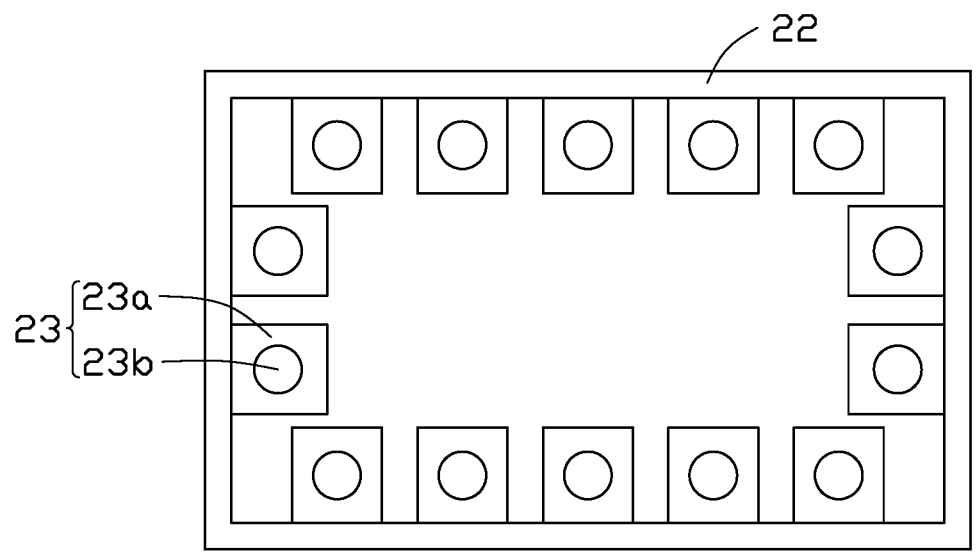
FIG. 4 is a schematic diagram of another embodiment of distribution of the first fastener on the liquid crystal panel.

FIG. 2 shows a first embodiment of the first fastener 23 and the second fastener 24. The first fastener 23 includes a main portion 23a and at least one protruding portion 23b extending from the main portion 23a toward the backboard 21. A surface of the main portion 23a facing away from the protruding portion 23b is bonded to the liquid crystal panel 22. In one embodiment, the liquid crystal display device 20 includes one first fastener 23. As shown in FIG. 3, the main portion 23a is annularly distributed around a periphery of the liquid crystal panel 22. The main portion 23a is spaced apart from a plurality of protruding portions 23b, and a specific quantity of the protruding portions 23b can be designed according to actual needs. In one embodiment, referring to FIG. 2 and FIG. 4, the liquid crystal display device 20 includes a plurality of first fasteners 23, each of which includes a main portion 23a and a protruding portion 23b. The plurality of first fasteners 23 are spaced around the periphery of the liquid crystal panel 22, and a specific quantity of the first fasteners 23 can be designed according to actual needs.

Referring to FIG. 2 again, the second fastener 24 includes a bonding portion 24a and at least one latching portion 24b. The bonding portion 24a is fixed to at least one of a sidewall or a bottom wall of the backboard 21. The latching portion 24b defines a channel 24c for receiving and fixing the protruding portion 23b of the first fastener 23. A shape of the channel 24c matches a shape of the protruding portions 23b. For example, if the protruding portion 23b is cylindrical, the channel 24c is cylindrical, or if the protruding portion 23b is rectangular parallelepiped shaped, the channel 24c is rectangular parallelepiped shaped. An inner diameter of the channel 24c may be slightly smaller than a width of the protruding portion 23b so that the protruding portion 23b can be tightly fit in the channel 24c after being inserted into the channel 24c. In other words, the protruding portion 23b undergoes a slight elastic deformation after being inserted into the channel 24c, and the first fastener 23 and the second fastener 24 can be fixed to each other by interference fit between an inner wall of the channel 24c and the protruding portion 23b. Thus, a position of the liquid crystal panel 22 relative to the backboard 21 is fixed, and the first fastener 23 and the second fastener 24 replaces the middle frame 13 of the related art to reduce or eliminate a width A of the middle frame 13.

The liquid crystal panel 22 and the first fastener 23 are regarded as a first component, and the second fastener 24 and the backboard 21 are regarded as a second component. A quantity of the latching portions 24b is equal to a quantity of the protruding portions 23b. When the latching portions 24b and the corresponding protruding portions 23b are engaged with each other, the first component and the second component achieve a stable laminated assembly.

Figure 5:
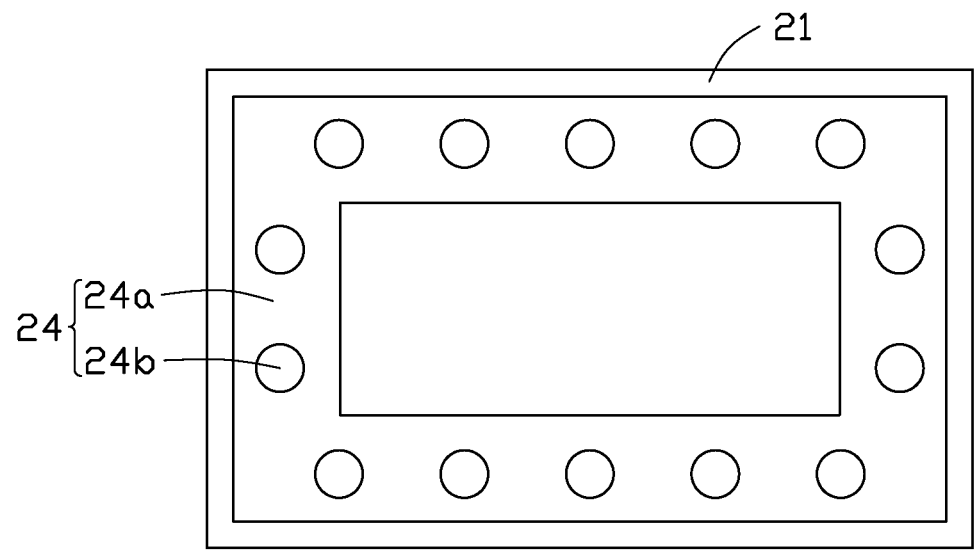
FIG. 5 is a schematic diagram of an embodiment of distribution of the second fastener on a backboard.
Figure 6:
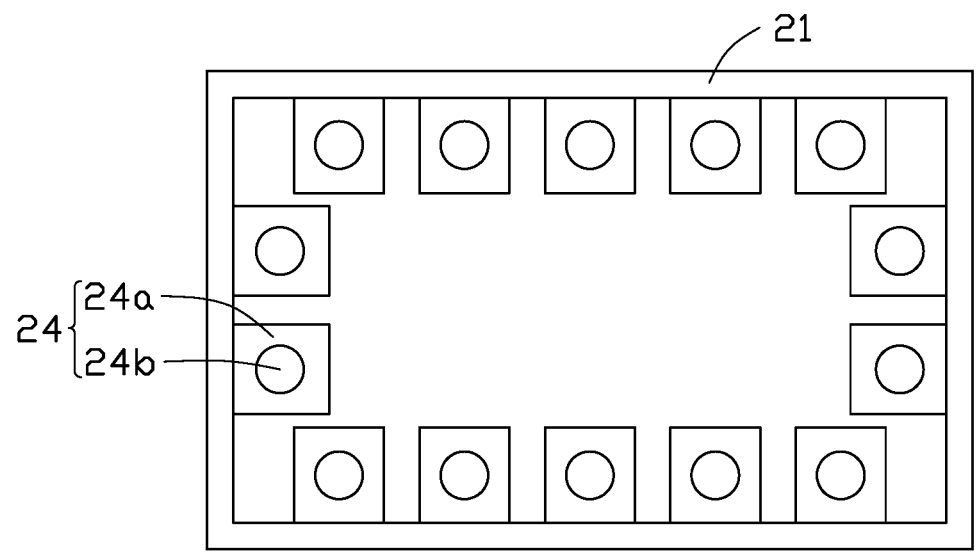
FIG. 6 is a schematic diagram of another embodiment of distribution of the second fastener on the backboard.

In one embodiment, as shown in FIG. 2 and FIG. 5, the liquid crystal display device 20 includes one second fastener 24, and the second fastener 24 includes one bonding portion 24a and a same quantity of latching portions 24b as the protruding portions 23b. The latching portion 24a is disposed around a periphery of the backboard 21. In another embodiment, as shown in FIG. 2 and FIG. 6, the liquid crystal display device 20 includes a plurality of second fasteners 24, each of which includes a bonding portion 24a and a latching portion 24b. The plurality of second fasteners 24 are spaced around a periphery of the backboard 21 at intervals.

Referring to FIG. 2 again, a buffered light shielding layer 25 is disposed on a surface of a portion of the first fastener 23 facing away from the liquid crystal panel 22. The buffered light shielding layer 25 functions as a buffer when the first fastener 23 and the second fastener 24 are fixed together. It can be understood that the first fastener 23 and the second fastener 24 correspond to a non-display area of the display device including the liquid crystal display device 20, so that the buffered light shielding layer 25 prevents a backlight of the display area from leaking light at an edge of the display device. The buffered light shielding layer 25 may be made of rubber.

The liquid crystal display device 20 further includes an optical film set 26 disposed between the backboard 21 and the liquid crystal panel 22 and spaced apart from the second fastener 24. The optical film set 26 evenly distributes and diffuses light emitted from a backlight disposed on the backboard 21 to obtain a uniform backlight that can be used for display. The optical film set 26 can include a reflective film, a diffusion film, and brightness enhancement film such as a prism sheet, a light guide plate, or the like.

The liquid crystal display device 20 connects the liquid crystal panel 22 and the backboard 21 together by engagement between the first fastener 23 and the second fastener 24, thereby omitting the middle frame in the related art, so that there is no exposed portion of the middle frame, and a width of the liquid crystal display device 20 is reduced.

Figure 7:
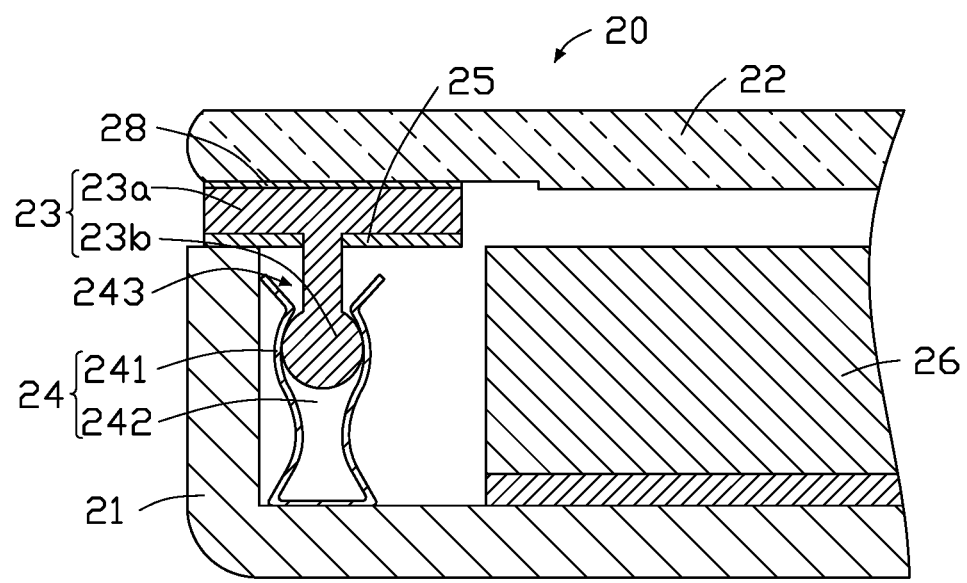
FIG. 7 is a cross-sectional view of the liquid crystal display device having a second embodiment of a first fastener and a second fastener.

FIG. 7 shows a second embodiment of the first fastener 23 and the second fastener 24. In the second embodiment, the first fastener 23 and the second fastener 24 are engaged by elastic engagement. The liquid crystal display device 20 of the second embodiment includes at least one first fastener 23 and at least one second fastener 24. In one embodiment, the liquid crystal display device 20 includes a plurality of first fasteners 23 and a plurality of second fasteners 24. The plurality of second fasteners 24 are disposed at intervals around the periphery of the backboard 21. The plurality of first fasteners 23 correspond one-to-one with the plurality of second fasteners 24 and are disposed at intervals around the periphery of the liquid crystal panel 22. In one embodiment, the liquid crystal panel 22 includes one first fastener 23 including a plurality of main portions 23a and a plurality of protruding portions 23b respectively extending from the main portions 23a toward the backboard 21.

An end of the protruding portion 23b of the first fastener 23 is substantially spherical. The second fastener 24 includes two opposite sidewalls 241, and the two sidewalls 241 cooperatively define a receiving cavity 242 and an opening 243. The opening 243 communicates with the receiving cavity 242. Ends of the two sidewalls 241 adjacent to the opening 243 are bent away from each other to form an inclined portion to facilitate insertion of the spherical end of the protruding portion 23b. The two sidewalls 241 curve away from each other to form an arced portion to surround the receiving cavity 242 for receiving the spherical end of the protruding portion 23b. A diameter of a circle formed at a joint between the inclined portion and the arced portion is less than a diameter of the spherical end of the protruding portion 23b, so that the spherical end of the protruding portion 23b is not easily removed out of the receiving cavity 242, and the first fastener 23 is engaged with the second fastener 24. It can be understood that the end of the protruding portion 23b is inserted into the receiving cavity 242 from the opening 243, and the second fastener 24 undergoes a certain elastic deformation, that is, the sidewalls 241 are deformed outward by the spherical end of the protruding portion 23b to expand the opening 243. In one embodiment, a bottom of the second fastener 24 is fixed to the backboard 21.

Figure 8:
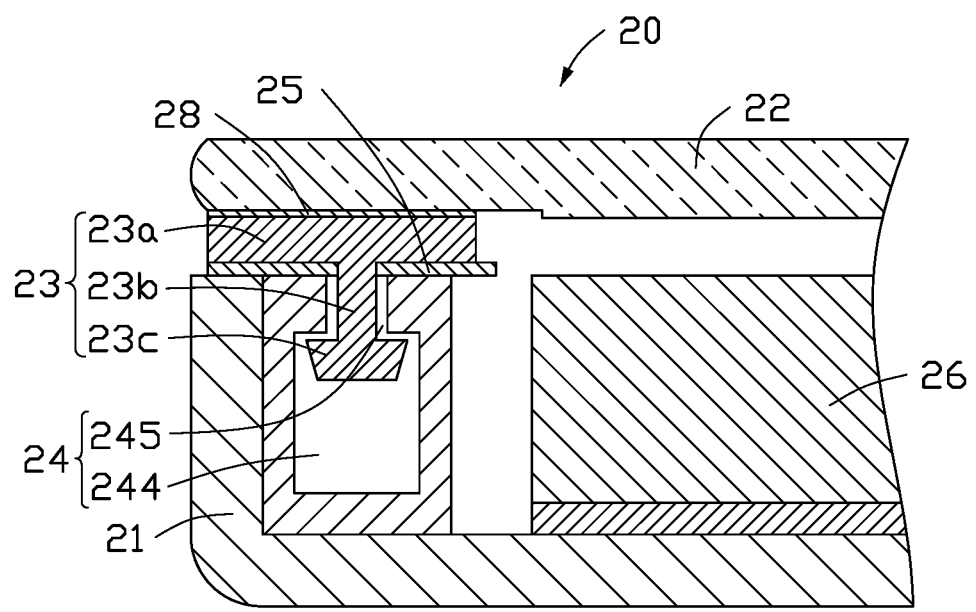
FIG. 8 is a cross-sectional view of the liquid crystal display device having a third embodiment of a first fastener and a second fastener.
Figure 9:
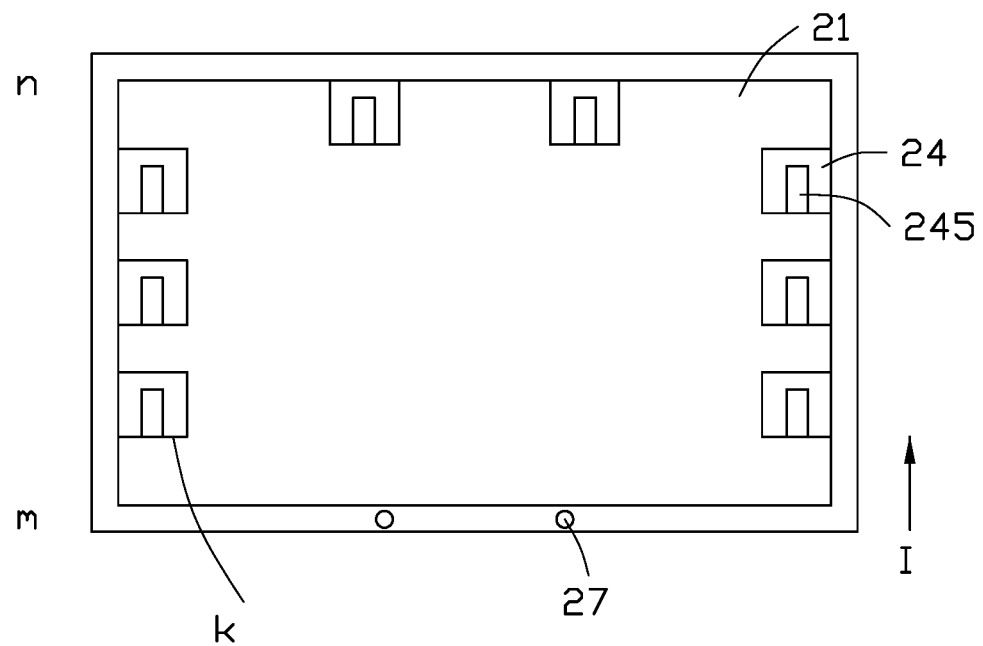
FIG. 9 is a schematic diagram of an embodiment of distribution of the second fastener in FIG. 8 on the backboard.
Figure 10:
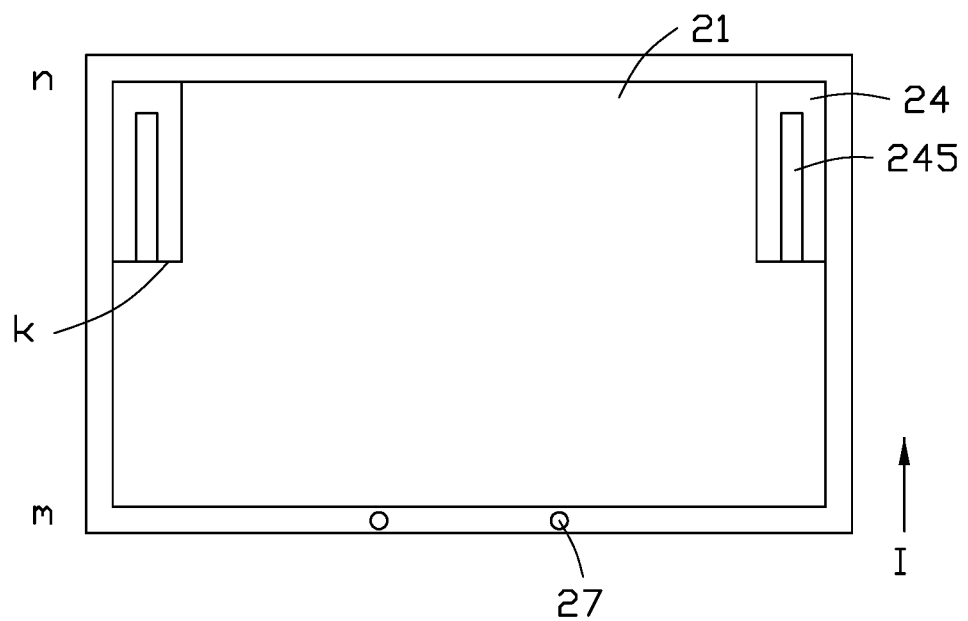
FIG. 10 is a schematic diagram of another embodiment of distribution of the second fastener in FIG. 8 on the backboard.

FIG. 8-9 or 8 and 10 show a third embodiment of the first fastener 23 and the second fastener 24 engaged with each other by sliding engagement. The sliding engagement refers to the first fastener 23 sliding from an open end of the second fastener 24, that is, an open end k shown in FIG. 9, into an interior of the second fastener 24 in a direction parallel to a bottom of the backboard 21. In this way, the second fastener 24 does not elastically deform.

As shown in FIG. 8, an end of the protruding portion 23b of the first fastener 23 includes a latching end 23c. When the protruding portion 23b is inserted into the second fastener 24 through the open end k, the latching end 23c is blocked by a portion of the second fastener 24 to prevent the latching end 23c from being detached from the second fastener 24 in a direction perpendicular to a plane of the backboard 21. Thus, the first fastener 23 and the second fastener 24 can be fixed together. In one embodiment, a side of the second fastener 24 facing away from the backboard 21 defines a gap 245 communicating with the receiving space 244 through which the first fastener 23 is inserted. A width of the gap 245 is less than a maximum width of the latching end 23c, so that the latching end 23c is prevented from being removed out of the receiving space 244 in a direction perpendicular to the plane of the backboard 21.

Referring to FIG. 9, when the liquid crystal panel 22 and the first fastener 23 are moved in a direction parallel to the backboard 21 along a direction I from a side m of the backboard 21 to a side n of the backboard 21, the protruding portion 23b of the first fastener 23 is inserted into the second fastener 24 through the open end k. At least one extending portion 27 is disposed on the side m of the backboard 21 to prevent the liquid crystal panel 22 from moving opposite the direction I and thereby prevent the protruding portion 23b from sliding out of the open end k of the second fastener 24. In one embodiment, a plurality of second fasteners 24 are disposed on the backboard 21 around the periphery of the backboard 21, and a specific quantity of the second fasteners 24 can be designed according to actual needs.

Referring to FIGS. 8 and 10, the liquid crystal display device 20 includes two second fasteners 24 respectively disposed in two corners of the backboard 21 adjacent to the side n. A length of each second fastener 24 is not more than half a length of a short side of the backboard 21. It can be understood that the first fasteners 23 are disposed on the liquid crystal panel 22 corresponding to the distribution of the second fasteners 24, and a quantity of the latching ends 23c is equal to a quantity of the second fasteners 24. A length of the protruding portion 23b of the first fastener 23 is not more than half of the length of the short side of the backboard 21.

Figure 11:
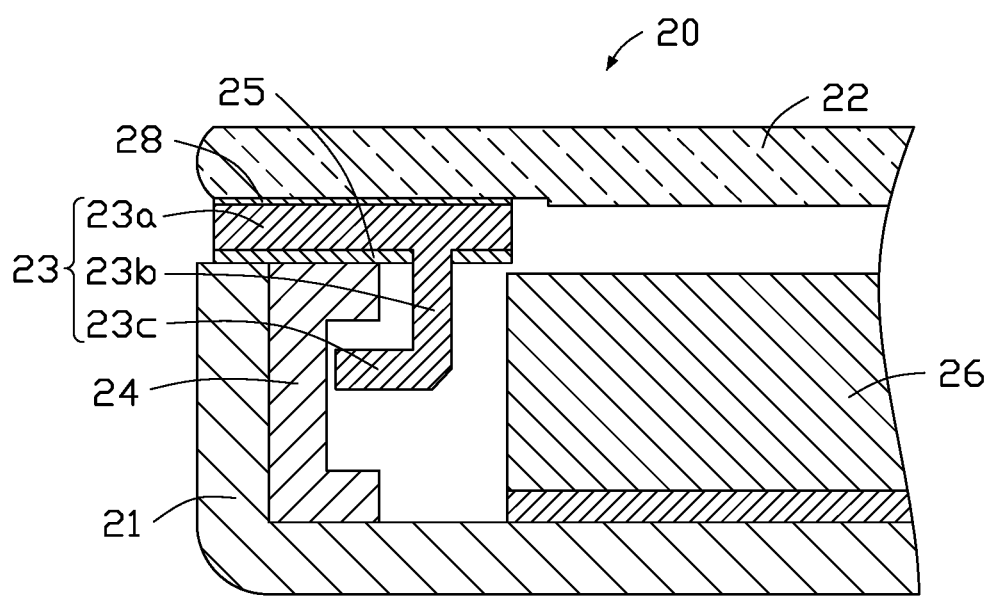
FIG. 11 is a cross-sectional view of the liquid crystal display device having a fourth embodiment of a first fastener and a second fastener.

FIG. 11 shows a fourth embodiment of the first fastener 23 and the second fastener 24 engaged with each other by a sliding engagement. The second fastener 24 has a concave shape and defines a recess for receiving the latching end 23c of the first fastener 23. A side of the second fastener 24 facing away from the recess is fixed to a sidewall of the backboard 21. The latching end 23c and the protruding portion 23b of the fastener 23 are coupled substantially perpendicularly together. The latching end 23c is inserted into the recess by sliding engagement between the first fastener 23 and the second fastener 24, and the latching end 23c is received between the optical film set 26 and the second fastener 24. Thus, the first fastener 23 and the second fastener 24 are fixed together in a direction perpendicular to the plane of the backboard 21 to fix a relative position of the liquid crystal panel 22 and the backboard 21.

A method of assembling the liquid crystal display device 20 includes fixing the first fastener 23 to the liquid crystal panel 22, fixing the second fastener 24 to the backboard 21 by welding, riveting or mechanically locking, and then engaging the first fastener 23 with the second fastener 24 to fix the relative positions of the first fastener 23 and the second fastener 24.

Figure 12:
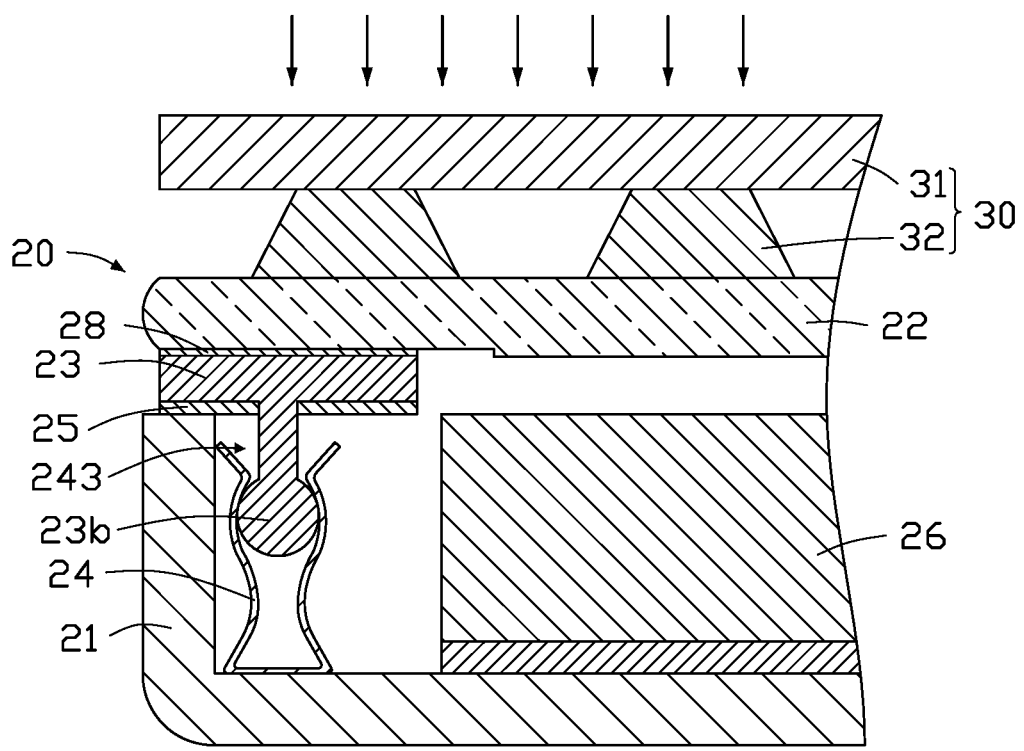
FIG. 12 is a cross-sectional view showing assembly of the liquid crystal panel to the backboard.
Figure 13:
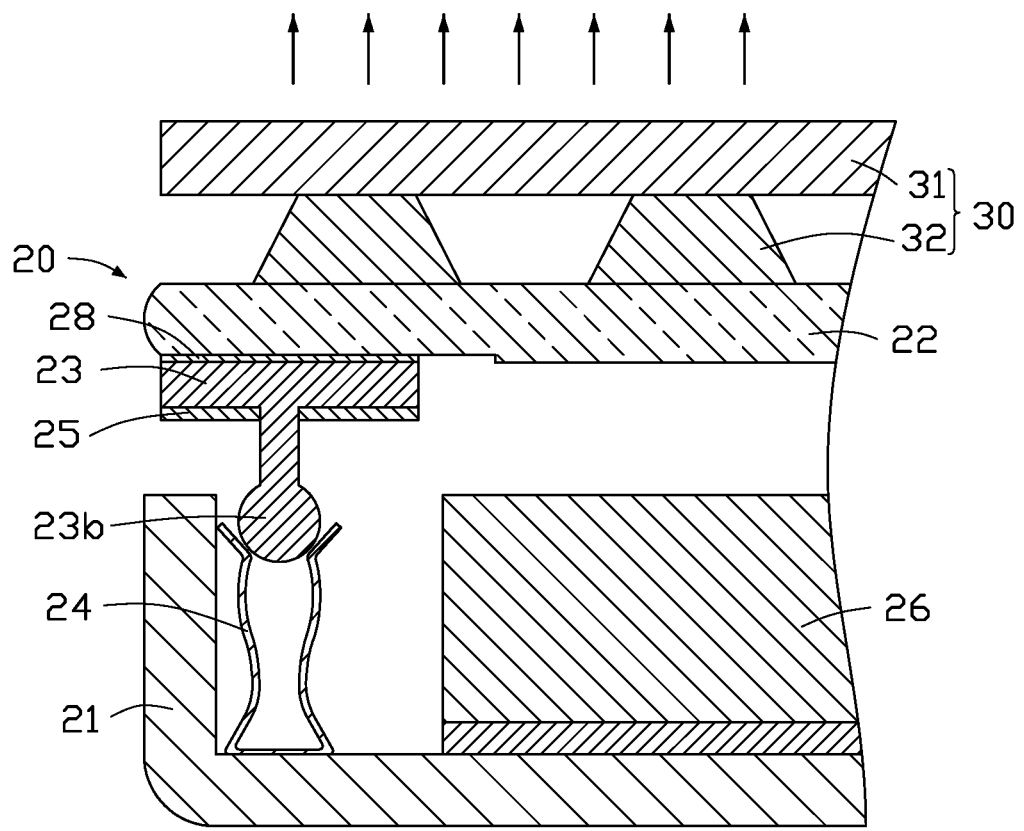
FIG. 13 is a cross-section view showing disassembly of the liquid crystal panel from the backboard.

FIGS. 12-13 show an embodiment of a process of engaging the first fastener 23 with the second fastener 24 and removing the first fastener 23 from the second fastener 24 in the second embodiment of the first fastener 23 and the second fastener 24. A surface of the liquid crystal panel 22 facing away from the first fastener 23 is uniformly pressed by a pressing device 30, so that the first fastener 23 is partially inserted into the second fastener 24 to be engaged and fixed.

As shown in FIG. 12, the pressing device 30 includes a pressing plate 31 and a plurality of suction cups 32 spaced apart from each other on the pressing plate 31. When the pressing plate 31 is evenly pressed, the plurality of suction cups 32 evenly press the liquid crystal panel 22 to cause the protruding portion 23b of the first fastener 23 to insert into the second fastener 24.

As shown in FIG. 13, to remove the first fastener 23 from the second fastener 24, the suction cups 30 pull the liquid crystal panel 22 away from the backboard 21, so that the first fastener 23 is removed from the second fastener 24. The suction cups 32 adhere to the surface of the liquid crystal panel 22 so that the suction cups 32 do not detach from the liquid crystal panel 22 when the liquid crystal panel 22 is pulled away from the backboard 21.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:
1. A liquid crystal display device comprising:
a backboard mounting a backlight; and
a liquid crystal panel displaying images on a light path of the backlight; wherein:
the liquid crystal panel comprises a first fastener and a second fastener;
the first fastener is disposed and fixed on a peripheral portion of a side of the liquid crystal panel facing the backboard;
the second fastener is fixed to a peripheral portion of the backboard facing the liquid crystal panel; and
the first fastener and the second fastener are engaged with each other;
wherein the first fastener is engaged with the second fastener by elastic engagement;
wherein the first fastener comprises a protruding portion; the second fastener comprises a latching portion defining a channel for receiving the protruding portion by interference fit;
wherein the first fastener comprises a protruding portion; an end of the protruding portion forms a spherical end; the second fastener comprises two sidewalls cooperatively defining a receiving cavity and an opening, the opening communicating with the receiving cavity;

ends of the two sidewalls adjacent to the opening are bent away from each other to form an inclined portion;

the two sidewalls curve away from each other to form an arced portion surrounding the receiving cavity;

a diameter of a circle formed at a joint between the inclined portion and the arced portion is less than a diameter of the spherical end of the protruding portion;

the spherical end is inserted into the receiving cavity from the opening, and the opening is elastically expanded as the spherical end is inserted through the opening to engage the first fastener with the second fastener.

2. The liquid crystal display device of claim 1, wherein:
the first fastener is adhered to the liquid crystal panel by an adhesive.

3. The liquid crystal display device of claim 1, wherein:
the second fastener is fixed to the backboard by welding, riveting, or mechanical locking.

4. The liquid crystal display device of claim 1, wherein:
the first fastener and the second fastener are engaged with each other by sliding engagement.

5. The liquid crystal display device of claim 4, wherein:
the first fastener comprises a latching end;
the latching end is slid along a direction parallel to a plane of the backboard to insert the latching end through an open end of the second fastener into the second fastener to engage the first fastener with the second fastener.

6. The liquid crystal display device of claim 1, wherein:
the first fastener comprises a buffered light shielding layer disposed on a surface of a portion of the first fastener facing away from the liquid crystal panel.

7. The liquid crystal display device of claim 1, wherein:
an orthographic projection of the first fastener and the second fastener on the liquid crystal panel does not exceed or partially exceed an outermost edge of the liquid crystal panel.

8. A method of assembling a liquid crystal display device, the method comprising:
fixing a first fastener to a liquid crystal panel;
fixing a second fastener to a backboard;
engaging the first fastener with the second fastener to fix the first fastener and the second fastener together;
wherein the first fastener and the second fastener are engaged together by elastic engagement; and
wherein a surface of the liquid crystal panel is evenly pressed by a pressing device to cause the first fastener to partially insert into the second fastener to engage the first fastener with the second fastener.

9. The method of claim 8, wherein:
the first fastener and the second fastener are engaged together by sliding engagement.

10. A liquid crystal display device comprising:
a backboard mounting a backlight; and
a liquid crystal panel displaying images on a light path of the backlight; wherein:
the liquid crystal panel comprises a first fastener and a second fastener;
the first fastener is fixed on a peripheral portion of a side of the liquid crystal panel facing the backboard;
the second fastener is fixed to a peripheral portion of the backboard facing the liquid crystal panel;
wherein the first fastener is engaged with the second fastener by elastic engagement;
wherein the first fastener comprises a main portion fixed on the liquid crystal panel and a protruding portion extending from the main portion toward the backboard;
wherein the second fastener comprises a latching portion defining a channel for receiving the protruding portion;
wherein a shape of the channel matches a shape of the protruding portions;
wherein an inner width of the channel is smaller than a width of the protruding portion, and the protruding portion is tightly fit in the channel to make the first fastener and the second fastener to be engaged with each other.

* * * * *